Figure 1:
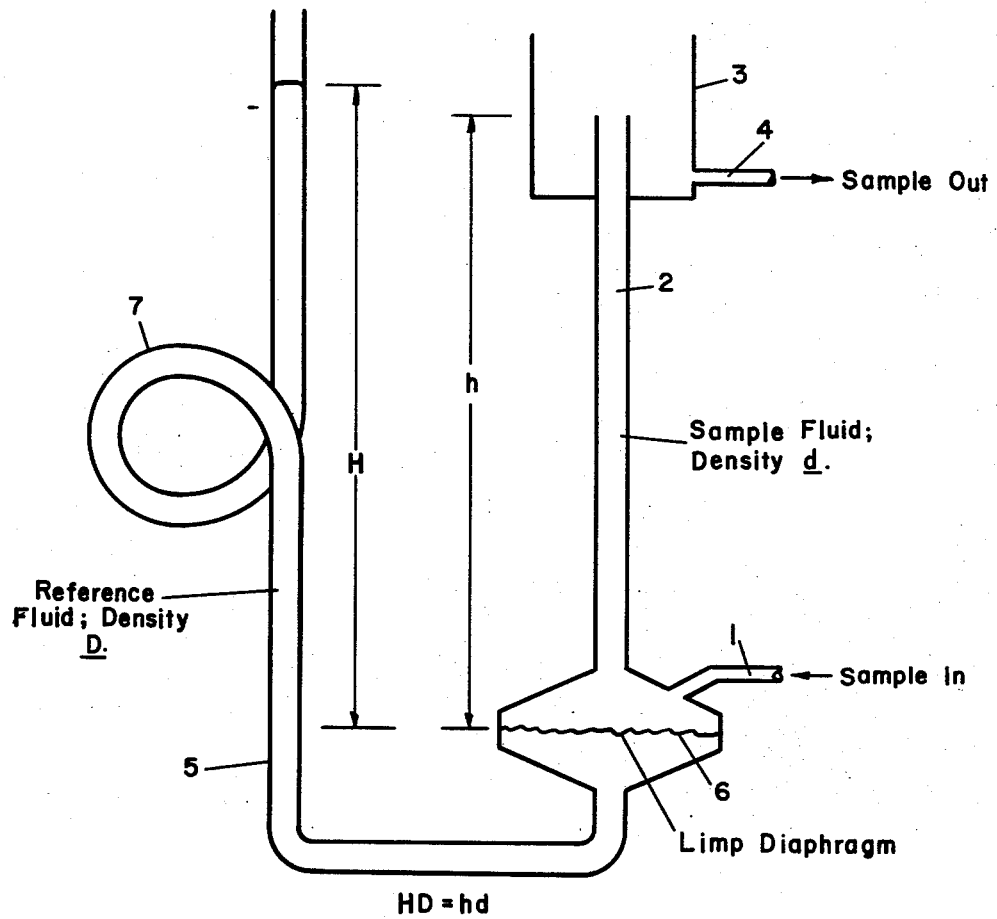

June 22, 1965  J R. WRIGHT  3,190,126
CONTINUOUS DENSIMETER

Filed July 5, 1962  2 Sheets-Sheet 1

INVENTOR.
J RONDLE WRIGHT

BY *George L. Church*
ATTORNEY

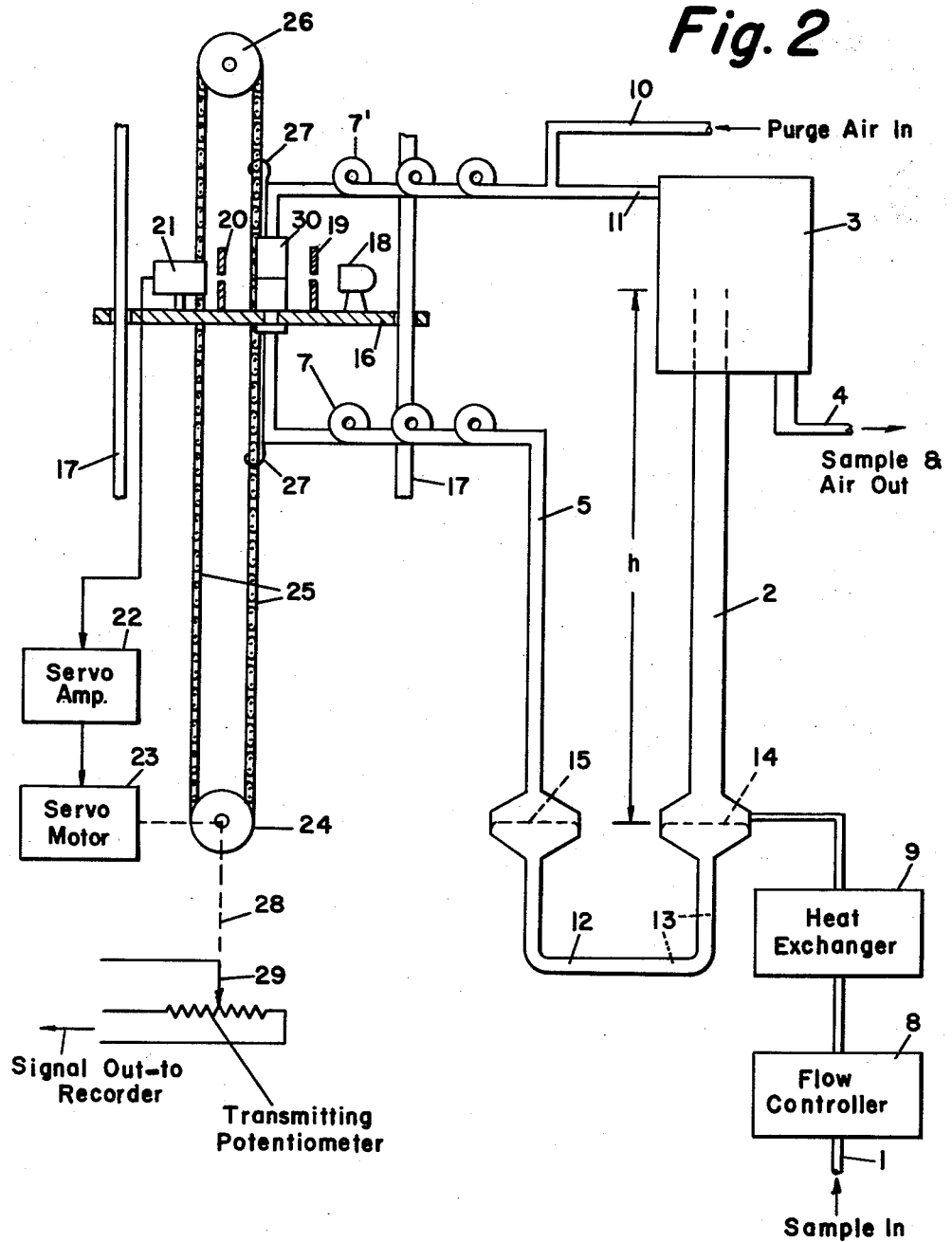

3,190,126
CONTINUOUS DENSIMETER
J Rondle Wright, Newtown Square, Pa., assignor to Sun Oil Company, Philadelphia, Pa., a corporation of New Jersey
Filed July 5, 1962, Ser. No. 207,574
2 Claims. (Cl. 73—438)

This invention relates to an instrument for the continuous measurement of the density (gravity) of liquid streams.

Continuous densimeters are of four general types or classes. First may be mentioned weighing type densimeters. In this type, a special container of constant volume is balanced on a knife-edge, or other suitable bearing. The force required to maintain balance is proportional to the density of the liquid.

Second, there may be mentioned float type densimeters. These employ an indirect weighing method. The float is usually completely submerged, and of constant volume. The buoyant force is then measured, and used as an indication of the liquid density.

A third type is radiation absorption dinsimeters. The radiation from decaying radioactive materials is absorbed by various liquids in proportion to the density of the liquid. In practice, a gamma ray emitter is strapped to one side of the pipe carrying the liquid, and a radiation detector to the other side. The radiation intensity at the detector varies inversely with the liquid density.

A fourth type is differential pressure densimeters. These measure the hydrostatic pressure of a vertical column of the liquid in question (sample liquid). The height of the column is maintained constant, so that the pressure drop across it is determined by the average density of the liquid, plus the viscous drag. The size of the column, and also the liquid flow rate, are selected to make the viscous drag small compared with the desired accuracy of the instrument. A prior instrument of this class uses a strain-gauge-type pressure transducer to measure the pressure drop across the column.

The densimeter of this invention falls in the differential pressure class. In connection with densimeters of this type, it is pointed out that strain gauges are rather fragile and subject to breakage, which makes for a fairly complicated densimeter construction. The present instrument does not utilize any strain gauge, but utilizes an entirely different method of measuring the differential pressure. It thus has a more rugged and more simple construction, as compared to prior instruments.

Briefly, the densimeter of this invention operates as follows: The pressure of a vertical column (tube) of sample fluid is balanced against another vertical column of a standard or reference liquid of known density, the latter of which is contained in a manometer. The height of the reference column is measured by means of a surface detector which employs a servo system to move vertically the upper end of the manometer; the vertical position of the manometer's upper end is indicated by a device also driven from the servo system.

A detailed description of the invention follows, taken in conjunction with the accompanying drawings, wherein:

FIG. 1 is a schematic diagram, illustrating the principle of operation of the densimeter of the invention; and FIG. 2 is a diagrammatic illustration of a practical densimeter according to the invention.

Refer first to FIG. 1. Sample liquid (i.e., a sample of a liquid stream whose density is to be measured) flows in continuous fashion at 1 into the bottom of a vertical tube 2, from whence it slowly rises in this tube and flows out the upper end thereof into an overflow tank 3, and then out of the instrument at 4. A manometer (U tube) 5 contains a quantity of a reference liquid of known density. The lower end of this manometer is coupled to the lower end of tube 2 through a suitable pressure-transmitting means which prevents mixing of the sample and reference fluids; this means is illustrated in FIG. 1 as a limp, impervious diaphragm 6. The manometer 5 is shown as having a tubing coil 7 therein; this is to indicate that there is a flexible section in this manometer, to enable the upper end of the manometer to be moved to a limited extent (in the vertical direction) with respect to the lower end thereof. The purpose of this will become apparent hereinafter, in connection with FIG. 2.

The height $h$ of the sample column (tube 2) is fixed (and known), and the pressure acting downwardly on the limp diaphragm is $hd$, where $d$ is the density of the sample fluid. Since the density D of the reference liquid is constant (and known), any variation in the density of the sample will be reflected in a corresponding change in the height H of the reference column (in manometer 5), neglecting the viscous drag of the sample in tube 2. Stated mathematically, $HD=hd$, so $$d = H\frac{D}{h} = H \times \text{constant}$$

Thus, by measuring the height H of the reference column, the density $d$ of the sample may be determined.

A practical densimeter according to the invention is illustrated in FIG. 2. Here, the sample feed connection 1 to the bottom of the sample stand pipe or vertical tube 2 extends through a flow rate controller 8 and a heat exchanger 9. The latter is necessary since the densimeter should be maintained at a substantially constant temperature, and the incoming sample (upstream of the heat exchanger) is invariably hotter or colder than the instrument temperature. The sample (e.g., an oil) slowly rises in tube 2 and overflows into tank 3. A steady supply of purge air (the purpose of which will be explained hereinafter) flows into the upper part of overflow tank 3 by way of an air supply tube 10 and a tank branch tube 11. The sample, together with the purge air, flows out of the instrument by way of drain tube 4, which is connected to the bottom of overflow tank 3.

The vertically-extending manometer 5 contains a quantity of reference liquid (e.g., an oil) of known and constant density. The lower end of the tube 2 and the manometer 5 are coupled together through pressure-transmitting means comprising a U-shaped conduit 12 containing a quantity of mercury 13. That is to say, the pressure of the vertical tube 2 of sample is transmitted to the reference liquid manometer 5 through a mercury pool in the bottom of the composite U tube 2, 12, 5. The mercury (liquid) in conduit 12 is immiscible with the sample liquid in tube 2 and with the reference liquid in manometer 5.

By appropriate design of tube 2 and conduit 12, the surface of the interface 14 between the sample liquid and the mercury is made large (in area), so that a small change in sample density (and pressure) will cause a relatively large change in volume displacement of the mercury 13. Likewise, by appropriate design of manometer 5 and conduit 12, the surface of the interface 15 between the reference liquid and the mercury is made large (in area).

The upper end of the manometer 5 containing the reference liquid is firmly secured by any suitable means (not shown) to a carriage 16 which is arranged for movement in the vertical direction, being guided in this movement by the vertical guide rods 17. The connection of manometer 5 to the movable carriage 16 is through a flexible tubing section indicated at 7, located between the carriage and the lower end of the manometer. This flexible connection may comprise a coil (helix) of small bore stainless steel tubing; see item 7 in FIG. 1.

A surface detector is also attached to carriage 16, adjacent the upper end of manometer 5. By way of example, a light beam and photocell type of detector is illustrated in FIG. 2. A lamp 18 projects a beam of light through a narrow (in the vertical direction) slit in a mask 19, thence through the wall of manometer 5 and through a narrow slit in another mask 20 onto a photocell 21. Portion 30 of the manometer 5, in the region of the carriage 16, is made of transparent tubing, so that light can be projected through the tubing wall. Items 18–21 are all fixedly mounted on carriage 16. Here, the light beam is interrupted by the reference liquid, when the upper surface of the latter rises slightly above a reference level established in manometer 5. If the reference liquid is transparent, the section of manometer 5 through which the light beam passes could be made triangular in horizontal cross-section; this would bend the light beam away from photocell 21 in well-known prism fashion.

The output of photocell 21 is fed to a servo amplifier 22, and the amplified output energizes a servo motor 23. Motor 23 drives a sprocket 24 around which passes a vertically-extending continuous drive chain 25. Sprocket 24 is located below carriage 16 and is journaled for rotation about a horizontal axis. Above carriage 16, chain 25 passes around an idler sprocket 26 which is also journaled for rotation about a horizontal axis. Motor 23 operates to drive carriage 16 (together with all the items mounted thereon or secured thereto) up and down, by means of chain 25. To effect this, hooks such as 27 are fastened to the upper end of manometer 5 and hooked into chain 25. In this connection, it will be remembered that the upper end of manometer 5 is firmly secured to carriage 16.

The vertical position of carriage 16 is controlled by the surface detector described. If the upper surface of the reference liquid in manometer 5 moves slightly above the reference level established in this manometer (as the result of an increase in the density of the sample liquid in tube 2, moving mercury pool 13 slightly toward the left), the photocell 21 is darkened, developing an error signal of one sense, which signal is amplified by amplifier 22 and applied to servo motor 23. Servo motor 23 is then energized in such a sense as to raise the carriage 16 (and the upper end of manometer 5) until the light beam is split. On the other hand, if the upper surface of the reference liquid in manometer 5 moves slightly below the reference level (as the result of a decrease in the density of the sample liquid in tube 2, moving mercury pool 13 slightly toward the right), the photocell 21 is flooded with light, developing an error signal of the opposite sense, which signal is amplified by amplifier 22 and applied to the servo motor. Servo motor 23 is then energized in such a sense as to lower carriage 16 (and the upper end of manometer 5) until the photocell is about half illuminated. In connection with the foregoing, it is pointed out that for any one density determination, the upper surface of the reference liquid remains stationary, while the upper end of manometer 5 is moved by the servo system as called for by the density change of the sample, as compared with a previous density value. Thus, there is relative movement between the manometer and the upper surface of the reference liquid, and this liquid can be brought to a predetermined position (reference level) established in manometer 5 by the surface detector. Thus, the servo loop acts (by lowering or raising the upper end of manometer 5) to keep the height H of the reference liquid column (see FIG. 1) in step with any change in density of the sample liquid.

The densimeter of the present invention operates with the reference liquid at essentially constant volume. The mercury displaces the reference liquid only enough to result in an error signal, and then the servo system takes over to cause vertical movement of the upper end of the manometer, essentially preventing any additional movement (up or down, as the case may be) of interface 15. Also, in the present densimeter, the amount of reference liquid in manometer 5 is fixed or constant.

The position of the carriage 16 which holds the surface detector (and thus the delineation of the height H, FIG. 1) can be converted into an electrical signal by mechanically connecting (as at 28) a multi-turn transmitting potentiometer 29 to the servo motor 23, which latter also drives the carriage. The signal developed across the potentiometer 29 may be recorded externally, by a conventional recorder. Alternatively, there could be used, for indicating the position of the carriage, an indicator or a counter on the servo motor itself.

There must be a tube connection from the top of the sample tube 2 to the top of the reference manometer 5, in order to be certain that the pressure is the same on both liquid surfaces. That is to say, the upper ends of the tube and manometer must be placed in communication with each other. This connection from the movable upper end of manometer 5 to the tank branch tube 11 is made through a flexible tubing section indicated at 7' which, like flexible tubing section 7, may comprise a coil of small bore stainless steel tubing.

In order to keep sample vapors from contaminating the reference liquid through the interconnecting tube 11, 7', a constant stream of purge air is introduced at 10 into this interconnecting tube. This purge air flows slowly through the tubes 10 and 11 into the overflow tank 3, and out with the spent sample at 4.

By properly sizing the diameter of tube 2, the sample flow rate through this tube, etc., the viscous drag in tube 2 is made small, to reduce the error of measurement of density. To eliminate this viscous drag factor entirely, intermittent density measurements (during which measurements the flow through tube 2 is entirely cut off) can be made, if desired.

In FIG. 2, the pressure-transmitting means (which couples together the lower end of the tube and manometer) comprises the mercury pool 13. However, this means may comprise a limp diaphragm, as shown at 6 in FIG. 1. The diaphragm material should be inert to both the reference and sample liquids. Thermoplastic materials such as nylon and "Teflon" would be inert to most liquids. Thin metal diaphragms, made for example of stainless steel, could also be used.

The surface detector, instead of the light beam and photocell type previously described, could be in the form of two vertical plates of a condenser, with the reference liquid upper surface in the center. Movement of the upper surface of the reference liquid would change the capacitance of the condenser, producing an error signal which by means of the servo amplifier would drive the servo motor to restore balance.

A third type of surface detector would utilize a magnetic float, such as a hollow iron sphere. This small float would ride on the upper surface of the reference liquid. A sensing coil or coils would be wound around the upper end of the manometer, and would produce an alternating magnetic field on the float. Position of the float relative to the coils would then be determined by the amount of flux linkage between the coils. This type of position indicator is well known.

The invention claimed is:

1. In a densimeter, a vertical tube having an open upper end; means for continuously flowing into said tube and out its upper end a liquid whose density is to be measured, a vertically-extending conduit containing a quantity of reference liquid of known density, pressure-transmitting means coupling together the lower ends of said tube and said conduit, means placing the space above the upper end of said tube into communication with the interior of said conduit above the upper surface of said reference liquid, means for developing an error signal in response to any movement of the upper surface of said reference liquid with respect to a reference level, a servo system energized in response to said error signal to move said conduit in the vertical direction, thereby to return the reference liquid upper surface to said reference level, and a transmitting potentiometer connected to said servo system.

2. Combination as defined in claim 1, including also means connected to said potentiometer for indicating the vertical position of said reference liquid upper surface with respect to the lower end of said conduit in terms of the density of the liquid.

References Cited by the Examiner
UNITED STATES PATENTS

| | | | |
|---|---|---|---|
| 2,376,459 | 5/45 | Stevens. | |
| 2,380,177 | 7/45 | Hicks | 73—401 |
| 2,451,605 | 10/48 | Barnes | 73—438 |
| 2,841,011 | 7/58 | Mayes et al. | 73—401 |
| 2,942,466 | 6/60 | Barron et al. | 73—401 X |

RICHARD C. QUEISSER, *Primary Examiner.*
ROBERT L. EVANS, *Examiner.*